(12) United States Patent
Uttermann et al.

(10) Patent No.: US 9,857,912 B2
(45) Date of Patent: Jan. 2, 2018

(54) PORTABLE MULTI-TOUCH INPUT DEVICE

(71) Applicant: Apple Inc., Cupertino, CA (US)

(72) Inventors: Erik A. Uttermann, Cupertino, CA (US); Rico Zorkendorfer, Cupertino, CA (US); Andrew Lauder, San Francisco, CA (US); Sean S. Corbin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/268,816

(22) Filed: Sep. 19, 2016

(65) Prior Publication Data

US 2017/0003818 A1    Jan. 5, 2017

Related U.S. Application Data

(63) Continuation of application No. 14/600,662, filed on Jan. 20, 2015, now Pat. No. 9,507,455, which is a
(Continued)

(51) Int. Cl.
*G06F 3/041* (2006.01)
*G06F 3/0354* (2013.01)
(Continued)

(52) U.S. Cl.
CPC .......... *G06F 3/0416* (2013.01); *G06F 1/1613* (2013.01); *G06F 3/0383* (2013.01); *G06F 3/03547* (2013.01); *G06F 3/041* (2013.01); *G06F 3/0412* (2013.01); *G06F 3/0414* (2013.01); *G06F 3/04883* (2013.01); *G08C 17/02* (2013.01); *G06F 2203/0338* (2013.01); *G06F 2203/0384* (2013.01); *G06F 2203/04101* (2013.01); *G06F 2203/04104* (2013.01); *G06F 2203/04105* (2013.01); *G06F 2203/04808* (2013.01); *G08C 2201/30* (2013.01); *H04W 4/008* (2013.01)

(58) Field of Classification Search
CPC ...................................................... G06F 3/0416
USPC ........................................................... 345/173
See application file for complete search history.

(56) References Cited

U.S. PATENT DOCUMENTS

| | | | |
|---|---|---|---|
| 6,707,448 B1 * | 3/2004 | Kunimatsu | G06F 3/038 250/216 |
| 7,034,762 B2 * | 4/2006 | Huang | G06F 1/1626 343/702 |

(Continued)

FOREIGN PATENT DOCUMENTS

| | | |
|---|---|---|
| CN | 2766290 | 3/2006 |
| EP | 216274 | 4/1987 |

OTHER PUBLICATIONS

Author Unknown, "InterlinkWireless Bluetooth Touchpad Remote", http://www.antonline.com/p.sub.--VP4750-GP614106.htm, 2008.
(Continued)

*Primary Examiner* — Jason Olson
(74) *Attorney, Agent, or Firm* — Brownstein Hyatt Farber Schreck, LLP

(57) ABSTRACT

A portable input device is described. The portable input device can wirelessly send control signals to an external circuit. The control signals can derive from touch or gestures applied to a touch sensitive surface. The control signals can also include a mouse click equivalent control signal generated by mechanical manipulation of the portable input device.

20 Claims, 6 Drawing Sheets

Related U.S. Application Data continuation of application No. 14/012,044, filed on Aug. 28, 2013, now Pat. No. 8,952,915, which is a continuation of application No. 12/819,829, filed on Jun. 21, 2010, now Pat. No. 8,537,128.

(51) Int. Cl.

| | |
|---|---|
| *G06F 3/038* | (2013.01) |
| *G06F 3/0488* | (2013.01) |
| *G08C 17/02* | (2006.01) |
| *G06F 1/16* | (2006.01) |
| *H04W 4/00* | (2009.01) |

(56) References Cited

U.S. PATENT DOCUMENTS

| | | | | |
|---|---|---|---|---|
| 7,133,026 | B2 | 11/2006 | Horie et al. | |
| 7,209,116 | B2* | 4/2007 | Gates | G06F 3/03543 345/156 |
| 7,209,119 | B2 | 4/2007 | Oguro | |
| 7,612,725 | B2* | 11/2009 | Hill | H01Q 1/243 343/700 MS |
| 7,696,981 | B2* | 4/2010 | Hsieh | G06F 3/0231 341/173 |
| 7,710,397 | B2* | 5/2010 | Krah | G06F 3/03543 345/163 |
| 7,746,324 | B2* | 6/2010 | Gates | G06F 3/03543 345/156 |
| 7,889,175 | B2* | 2/2011 | Kryze | G08C 17/02 345/156 |
| 7,960,682 | B2* | 6/2011 | Gardner, Jr. | G09G 3/3406 250/214 AL |
| 8,018,436 | B2* | 9/2011 | Gates | G06F 3/03543 345/156 |
| 8,269,675 | B2* | 9/2012 | Kough | H01Q 1/2266 343/702 |
| 8,384,003 | B2* | 2/2013 | Gardner, Jr. | G09G 3/3406 250/205 |
| 9,507,455 | B2 | 11/2016 | Uttermann et al. | |
| 2003/0117377 | A1* | 6/2003 | Horie | G06F 3/0346 345/173 |
| 2004/0051670 | A1* | 3/2004 | Sato | G06F 1/1616 343/702 |
| 2005/0200594 | A1 | 9/2005 | Hsieh | |
| 2006/0034042 | A1* | 2/2006 | Hisano | G06F 1/1616 361/679.04 |
| 2006/0274042 | A1* | 12/2006 | Krah | G06F 3/03543 345/163 |
| 2008/0042982 | A1* | 2/2008 | Gates | G06F 3/03543 345/173 |
| 2009/0002218 | A1* | 1/2009 | Rigazio | G08C 17/00 341/176 |
| 2009/0016000 | A1* | 1/2009 | Kobayashi | G02F 1/133308 361/728 |
| 2009/0153411 | A1* | 6/2009 | Chiang | H01Q 1/243 343/702 |
| 2009/0256757 | A1* | 10/2009 | Chiang | H01Q 13/10 343/702 |
| 2009/0256759 | A1* | 10/2009 | Hill | H01Q 1/243 343/702 |
| 2010/0045606 | A1 | 2/2010 | Liu et al. | |
| 2010/0123632 | A1* | 5/2010 | Hill | H01Q 1/243 343/702 |
| 2010/0315337 | A1* | 12/2010 | Ferren | G06F 1/169 345/158 |
| 2010/0321255 | A1* | 12/2010 | Kough | H01Q 1/2266 343/702 |
| 2010/0321325 | A1* | 12/2010 | Springer | G06F 3/041 345/174 |
| 2011/0006953 | A1* | 1/2011 | Chiang | G06F 1/1616 343/702 |
| 2011/0012793 | A1* | 1/2011 | Amm | H01Q 1/243 343/702 |
| 2011/0012794 | A1* | 1/2011 | Schlub | H01Q 1/243 343/702 |
| 2011/0018817 | A1* | 1/2011 | Kryze | G08C 17/02 345/173 |
| 2011/0136447 | A1* | 6/2011 | Pascolini | H01Q 1/243 455/90.2 |
| 2011/0163950 | A1* | 7/2011 | Ye et al. | G06F 3/0383 345/157 |
| 2011/0241949 | A1* | 10/2011 | Nickel | H01Q 1/243 343/702 |
| 2011/0254777 | A1* | 10/2011 | Campbell | G01L 1/02 345/173 |

OTHER PUBLICATIONS

Author Unknown, "Pocket Wireless Touchpad with Media Controls," Manhattan Computer Products, http://www.thinkgeek.com/electronics/home-entertainment/b210/?cpg=cj&ref=-&CJURL=http%3F%2Fwww.thinkgeek.com%2Felelectronics%Fhome-entertainmenr%2-Fb210%2F, Jun. 21, 2010.

Day, Shawn, "PC Remote Control," Synaptics Incorporated, Feb. 5, 2003.

DeCosta, Behram, "Remote Control for Zoomable UI on TV," Sony Corporation, IPD Case # 50X9061, Oct. 29, 2007.

\* cited by examiner

PORTABLE MULTI-TOUCH INPUT DEVICE

CROSS-REFERENCE TO RELATED APPLICATIONS

This application is a continuation patent application of U.S. patent application Ser. No. 14/600,662, filed Jan. 20, 2015 and titled "Portable Multi-Touch Input Device," which is a continuation patent application of U.S. patent application Ser. No. 14/012,044, filed Aug. 28, 2013 and titled "Portable Multi-Touch Input Device," now U.S. Pat. No. 8,952,915, which is a continuation patent application of U.S. patent application Ser. No. 12/819,829, filed Jun. 21, 2010 and titled "Portable Multi-Touch Input Device," now U.S. Pat. No. 8,537,128, the disclosures of which are hereby incorporated herein by reference in their entireties.

BACKGROUND

Field of the Invention

The invention relates to input devices used in support of consumer electronic devices and more particularly, a portable touch sensitive input device is described.

Description of the Related Art

In order to provide accurate and consistent motion and positional data, a computer mouse requires a flat, rigid surface on which to move. Relying on the availability of the flat, rigid surface in order to operate properly can be particularly troublesome in those situations where the computing device is portable in nature since the available surfaces may not be suitable. Therefore, it has become common practice to replace the computer mouse with the touchpad in mobile computing devices such as laptop computers, portable media players, and so forth. The conventional touchpad assembly typically includes operational circuitry enclosed within the housing of the mobile computing device and a touch sensitive surface exposed to receive touch events provided by either the user's finger(s) or other appropriate object. In this way, the typical mobile computing device can have the option of providing a keyed input (such as that provided by a keyboard or keypad) and the touch pad.

In contrast to the computer mouse, the touchpad can detect a wider variety of input events (such as multi-fingered gestures, swipes, and so forth). Since the computer mouse relies upon detection of motion in relation to the surface upon which it rests to provide the requisite data to the computing device, the wider gamut of information provided by gestural motions so easily provided by the trackpad is unavailable to the computer mouse.

Therefore, it would be desirable to provide touch based input devices suitable for use with both stationary and mobile computing systems.

SUMMARY

This paper describes various embodiments that relate to methods to associate a mobile wireless communication device and in particular a wireless input device.

A wireless input device includes a housing body, the housing body enclosing a rigid frame structure arranged to support operational components of the portable input device, a touch pad assembly, the touch pad assembly mounted to and supported by the rigid frame structure. The touch pad assembly includes a touch sensitive layer arranged to detect a touch event at the touch sensitive layer, and generate a first signal in accordance with the detected touch event. The wireless input device also includes a protective covering overlaying the touch sensitive layer, wherein the touch sensitive layer detects a touch event applied on or near the protective covering and generates a first signal based upon the detected touch event and an RF transmitter. The RF transmitter includes at least a portion of the rigid frame structure shaped in such a way to form a current path, wherein a voltage applied to the portion of the rigid frame structure causes current to flow along the current path resulting in generation of RF energy emitted by the RF transmitter.

A method performed by a wireless input device having a housing and a touch sensitive surface. The method can be carried out by detecting a touch event at the touch sensitive layer, generating a first signal in accordance with the detected touch event, detecting a force applied to the housing, generating a second signal in accordance with the detected force and wirelessly sending the first signal and the second signal to an external circuit in wireless communication with the wireless input device.

A system that includes a wireless control device in wireless communication with a media device is described where the wireless control device includes a rigid frame structure, a touch pad assembly, the touch pad assembly mounted to and supported by a rigid frame structure. The touch pad assembly includes a touch sensitive layer, the touch sensitive layer arranged to detect a touch event at the touch sensitive layer and generate a first signal in accordance with the detected touch event. The wireless control device also include a display layer integrally formed with the touch sensitive layer arranged to present visual content including icons used to control operations of the media device and an RF transmitter that includes a portion of the rigid frame structure shaped in such a way to form a current path, wherein a voltage applied to the portion of the rigid frame structure causes current to flow along the current path resulting in generation of RF energy emitted by the RF transmitter.

A non-transitory computer readable medium for storing a computer program executed by a processor in a wireless input device having a housing and a touch sensitive surface. The computer program including computer code for detecting a touch event at the touch sensitive layer, computer code for generating a first signal in accordance with the detected touch event, computer code for detecting a force applied to the housing, computer code for generating a second signal in accordance with the detected force and computer code for wirelessly sending the first signal and the second signal to an external circuit in wireless communication with the wireless input device.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
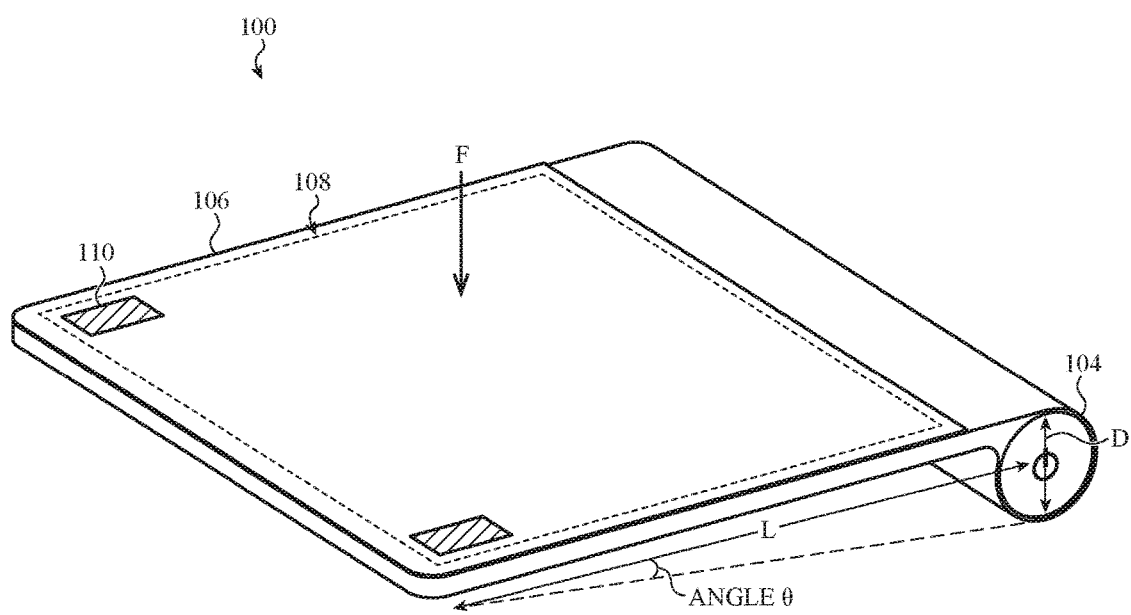
FIG. 1 shows representative portable input device 100 shown in a top perspective view in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Broadly speaking the embodiments herein describe a portable input device. The portable input device can include a touch pad capable of detecting a touch event in the form of multi-touch and gestural inputs provided by a user. The portable input device can respond to the touch event by providing a first signal to an external circuit for processing. The external circuit can take the form of a computing device along the lines of, for example, a desk top computing device, a portable computing device such as a laptop, or a consumer product such as a TV, projector, stereo and so forth. In the described embodiments, the portable input device can provide a second signal separate from the first signal. The second signal can be provided by a signal generating circuit incorporated into a structural component of the portable input device. The signal generating circuit can respond to a force applied directly to the structural component of the portable input device in accordance with a magnitude of the force and a duration of time that the force is applied (the combination referred to as a force contour). For example, when the applied force has a force contour that is well defined and of short duration, then the signal generating circuit can respond along the lines of a switch or switch-like device and provide the second signal in accordance with a mouse click, tap, and so forth. On the other hand, when the force contour is more continuous and of longer duration, the signal generating circuit can respond along the lines of a sensor or sensor like device where the second signal is more continuous in nature.

The second signal can be used to modify the first signal. The second signal can also be used to influence how the external circuit interprets the first signal. For example, when the user touches the touch pad in a direction and with a force akin to that of the user drawing figures with a finger or stylus, the first signal corresponding to the touch can be interpreted as a line drawing or sketch that can be presented on a display. Concurrently, the signal generating circuit can respond to the force applied by the finger or stylus by providing a corresponding second signal that can be used by the external circuit to modify the interpretation of the first signal, such as changing line color, thickness and so on. For example, the harder the pressure the thicker the line, redder the color, and so forth.

It should be noted that one or more signal generating circuits can be placed at any appropriate location of the portable input device. For example, one or more signal generating circuits can be associated with one or more support structures (referred to as device feet) located at various positions on the portable input device used to support the portable input device on a rigid surface. Moreover, a force applied to the portable input device can be detected by one or more of the signal generating circuits having locations that can vary widely. For example, one signal generating circuit can be located in an upper quadrant of the portable input device while another can be located in a lower quadrant while still others can be centrally located. In some cases, the portable input device can have a plurality of signal generating circuits distributed throughout.

The portable input device can take the form of a wireless touch pad. The wireless touch pad can have an effective communication range with the external circuit that varies widely. Accordingly, the wireless touch pad can be used in a close range environment (about a foot or so) with a desktop or laptop or in a more distant range environment (about 10 feet or so) as a remote control for a set top box, television, media center, and so forth. The wireless touch pad can include a plurality of operational circuitry. The plurality of operational circuitry can be used to detect touch events applied on or near a touch sensitive surface. The operational circuitry can also include a wireless transceiver used to facilitate wireless communication between the wireless touch pad and the external circuit. A particularly useful feature of the wireless touch pad is that there is no requirement for a RF antenna external to the wireless touch pad. Since at least a portion of the wireless touch pad housing is used as an RF resonator, there is no need for an antenna window to accommodate the transmission of RF signals. In a particularly useful embodiment, a portion of the wireless touch pad such as a metallic substructure, or frame, can be modified in such that an applied voltage can cause a current to flow in such a way that RF energy is radiated at the appropriate frequency and power (depending on the value of the applied voltage). Furthermore, by judiciously shaping the resonating portion, the direction and coherence of the radiated RF energy can be controlled.

The wireless touch pad can be lightweight having a size and shape suitable for being easily carried about in one hand and operated by the other hand. The size and shape of the portable touch pad can also present an aesthetic look that can substantially enhance the user's subjective and objective experience. For example, operational components of the wireless touch pad can be enclosed and supported by a housing integrally formed to include a structure that can act as both a battery compartment and a support piece. The support piece being arranged and shaped in such a way that when the wireless touch pad is resting on a rigid surface such as a table, the touch sensitive surface can be presented to the user at an ergonomically efficient and visually pleasing angle. The wireless touch pad can also include an attractive protective layer used to protect the touch sensitive surface as well as provide an appealing subjective tactile sensation to the user.

Furthermore, the shape of at least a portion of the frame can be used to tune the acoustic characteristics of a signal generating circuit in the form of a dome switch. As well known in the art, a dome switch (or any mechanical switch for that matter) can generate a distinctive sound along the lines of "CLICK". However, the subjective quality of the sound generated can be modified based upon the location of the dome switch within the frame substructure. The subjective quality of the sound can depend upon acoustic characteristics such as frequency, timbre and so on. These characteristics, in turn, can depend upon an amount of material that resonates from the energy released when the dome switch is engaged, i.e., the more material the lower the frequency, and vice versa. The quality of the sound generated by the dome switch can tuned in accordance with an amount of material that resonates when the dome switch is engaged. In this way, a desired quality of sound can be achieved by placing the dome switch in a position within the frame that encloses an amount of material corresponding to the desired acoustic properties of the "CLICK" sound when the dome switch is engaged.

These and other embodiments are discussed below with reference to FIGS. 1-6. However, those skilled in the art will readily appreciate that the detailed description given herein with respect to these figures is for explanatory purposes only and should not be construed as limiting.

FIG. 1 shows representative portable input device 100 shown in a top perspective view in accordance with the described embodiments. For the remainder of this discussion, portable input device 100 is presumed to be wireless in nature using well known and established wireless communication protocols such as WiFi, BlueTooth, and so on. However, although discussed in terms of a wireless configuration, any appropriate communication protocol, be it wireless or wired, can be used without loss of generality. Accordingly, portable input device 100 can include housing 102 formed of, for example, aluminum. Housing 102 can have an attractive finish formed by anodizing, painting, and so on and have a size and shape that renders portable input device 100 easy to carry about by a user in one hand and operated by the other. It is contemplated, however, that portable input device 100 is used as an adjunct to input devices already available to an external circuit (not shown) in wireless communication with portable input device 100. Portable input device 100 also includes enclosure 104 integrally formed with housing 102 used to support operational circuitry.

In some embodiments, enclosure 104 can also be used as a battery compartment into which a battery (or batteries) can be placed and used to provide power to the operational circuits as well as any operational components included in enclosure 104. In the embodiment shown and described, enclosure 104 can be sized and shaped to provide mechanical support for portable input device 100 when resting upon a rigid surface such as, for example, a desktop, tabletop, and so on. When placed upon and supported by the rigid surface, the size of shape of enclosure 104 can result in portable input device 100 being presented to the user at a convenient and ergonomically efficient presentation angle θ. For example, when enclosure 104 has diameter d of about 20 mm and housing 102 length l of about 125 mm, presentation angle θ can be on the order of about 10°. In this way, the user will better be able to conveniently and with little effort touch on or near protective layer 106 used to protect touch sensitive layer 108 enclosed and supported by housing 102. In some cases, protective layer 106 can be formed of highly polished glass or plastic. Protective layer 106 can be transparent in order to allow images to be viewed originating from a display layer having image elements in those embodiments of portable input device 100 so equipped. In those embodiments equipped with display elements, a number of visual indicia can be presented that can include for example, a number pad, a graphical user interface, an auxiliary menu, an auxiliary display for a computer system. The image elements can be embedded within the touch pad, the housing, or any other appropriate location. The image elements can display static, graphic, video, and textual information. In some embodiments, the image elements can be associated with haptic elements providing a tactile response corresponding to images presented. For example, the image elements can present an image of a dome button on the touch pad that when pressed, the associated haptic actuators can respond by providing a tactile response reminiscent of an actual dome button. However, in those situations where portable input device 100 does not include a display layer, protective layer 106 can be opaque or at least translucent to provide a more aesthetic look to portable input device 100.

A finger or other appropriate object (stylus, pen, and so on) placed on or near protective layer 106 can be detected by touch sensitive layer 108. Touch sensitive layer 108 can be used to provide user input to the external circuit in lieu of or in combination with other input devices. Touch sensitive layer 108 can include touch sensitive elements that are wholly or partially transparent, semitransparent, non-transparent, and opaque or any combination thereof. Touch sensitive layer 108 can be embodied as any multi-dimensional object having a touch sensitive surface for receiving touch input. In one example, touch sensitive layer 108 embodied as a touch screen can include a transparent and/or semitransparent touch sensitive panel partially or wholly positioned over at least a portion of a display. According to this embodiment, touch sensitive layer 108 functions to display graphical data (such as a graphical user interface, or GUI) and also functions to receive user input.

Touch sensitive layer 108 can be configured to detect the location of one or more touches or near touches on or near protective layer 106 based on capacitive, resistive, optical, acoustic, inductive, mechanical, chemical measurements, or any phenomena that can be measured with respect to the occurrences of the one or more touches or near touches in proximity to portable input device 100. Software, hardware, firmware or any combination thereof can be used to process the measurements of the detected touches to identify and track one or more gestures and provide a first signal (also referred to as touch signal T). Touch signal T can be forwarded to the external circuit for processing. The gestures can be associated with commands executed by a processor associated with or included in the external circuit that can be used to process data. A gesture can correspond to stationary or non-stationary, single or multiple, touches or near touches on portable input device 100. A gesture can be performed by moving one or more fingers or other objects in a particular manner on touch sensitive layer 108 such as tapping, pressing, rocking, scrubbing, twisting, changing orientation, pressing with varying pressure and the like at essentially the same time, contiguously, or consecutively. A gesture can be characterized by, but is not limited to a pinching, sliding, swiping, rotating, flexing, dragging, or tapping motion between or with any other finger or fingers. A single gesture can be performed with one or more hands, by one or more users, or any combination thereof.

Signal generating circuit 110 located within the body of portable input device 100 (at, for example, structural supports) can react to the user applying force F to portable input device 100 by pressing down upon portable input device 100. For example, at least one signal generating circuit 110 can react to the application of force F by generating a second signal independent of the first signal. The second signal can be sent to the external circuit in accordance with the first signal. In still other cases, the second signal can be the only signal sent to the external circuit. In this way, the external circuit can interpret the second signal as a discrete function such as a mouse click. In some situations, however, the operating environment of portable input device 100 can be such that generation of the second signal is impractical using only signal generating circuit 110. In this situation, software resident in either portable input device 100 or the external device can process a specific touch event at touch sensitive surface 108 in the same manner as the second signal. For example, if the second signal is interpreted to be functionally equivalent to a mouse click, a "tap to click" function can be enabled in those situations where generation of the second signal is not easily accomplished using signal generating circuit 110. It should be noted that the tap to click function can be enabled automatically or manually at the discretion of the user. In this case, the tap to click function can interpret a specific type of touch event (such as a tap) to be functionally equivalent to the second signal. In this way, a tap can be interpreted as a mouse click without the need to engage signal generating circuit 110. The tap to click function can be invoked by a user when the wireless touch pad is not placed upon a rigid surface or software can automatically enable the "tap" to click function when the wireless touch pad is removed from the rigid surface and placed in an environment (such resting on a lap or held by the user) unsuitable for facilitating the engagement of signal generating circuit 110.

It should be noted that signal generating circuit 110 can be located at any position of portable input device 100. For example, signal generating circuit 110 can be associated with support structures (referred to as device feet) that react to the user pressing on portable input device 100 by retracting into housing 102 and causing signal generating circuit 110 to engage generating the second signal. However, the resolution of force F at the location of the support structures can depend upon the location on portable input device 100 that force F is applied. For example, if force F is applied at or near one or more of the support structures associated with signal generating circuit 110, then most of force F is available to engage at least one or more signal generating circuit 110. If, however, force F is applied further away from signal generating circuit 110 (in the region of enclosure 104, for example), then lesser an amount of force F is available to engage signal generating circuit 110 requiring a greater exertion by the user in order to successfully engage signal generating circuit 110. In this way, the number and location of signal generating circuit 110 can directly affect an amount of force required to generate the second signal by engaging signal generating circuit 110.

Figure 2:
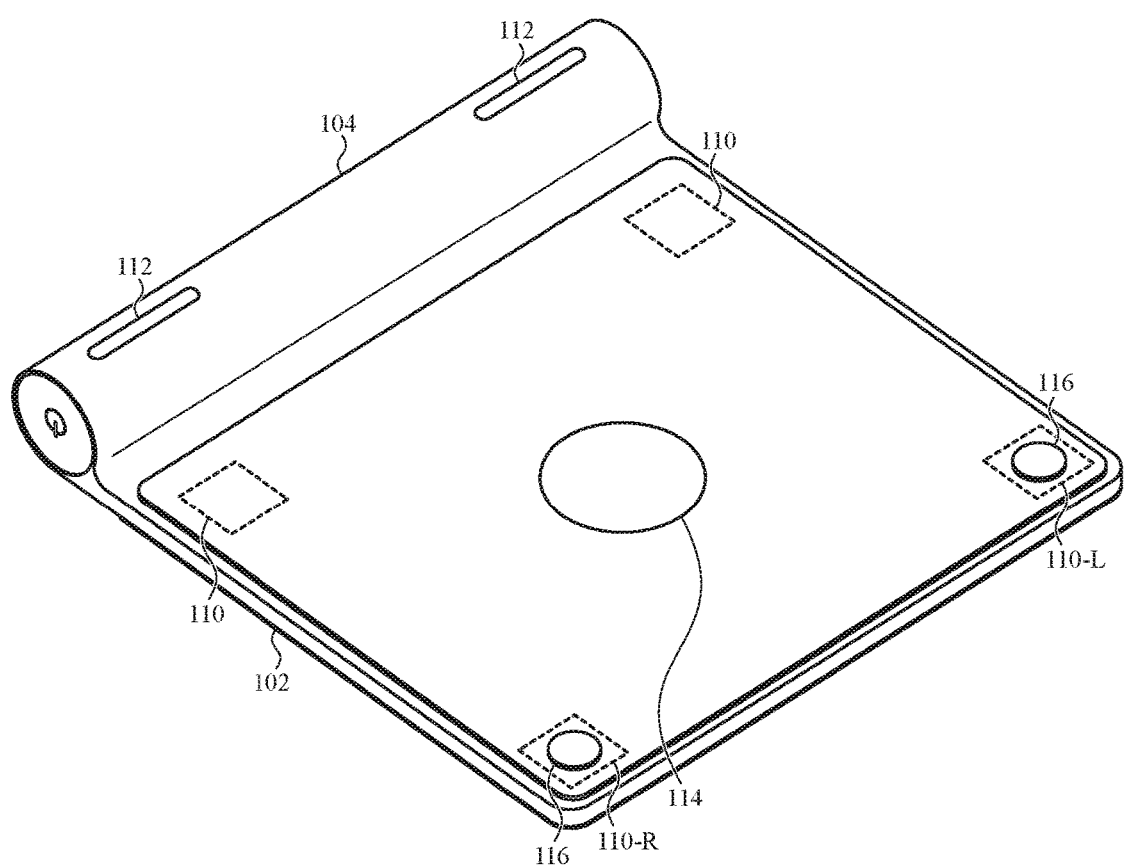
FIG. 2 shows a bottom perspective view of portable input device showing supports formed of compliant and skid resistant material.

FIG. 2 shows a bottom perspective view of portable input device 100 showing supports 112 formed of compliant and skid resistant material. Bottom protective layer 114 can be formed of resilient material such as plastic such as TPU, ABS, Support structures 116 (also referred to as device foot, or feet) can provide support for portable input device 100. Signal generating circuit 110 associated with support structures 116 can respond to the application of force F by generating the second signal. It should be noted that U.S. Pat. No. 8,213,177 entitled. "Device Foot" by Utterman et al that is incorporated by reference in its entirety for all purposes shows and describes a particular embodiment of support structures 116 (referred to as device feet). Support structures 116 can be configured to respond to force F by generating the second signal (also referred to as signal S) independent of touch signal T. Signal S can be generated when, in response to force F applied to protective layer 106, one or both support structures 116 retract into housing 102. In the process of retracting, one or both support structures 116 cause a corresponding actuator (110R and/or 110L) to engage resulting in the generation of signal S. Signal S can be wirelessly passed to the external circuit for processing independent of the processing of touch signal T. In some cases, however, signal S can be processed by portable input device 100 prior to being wirelessly passed to the external circuit.

Figure 3:
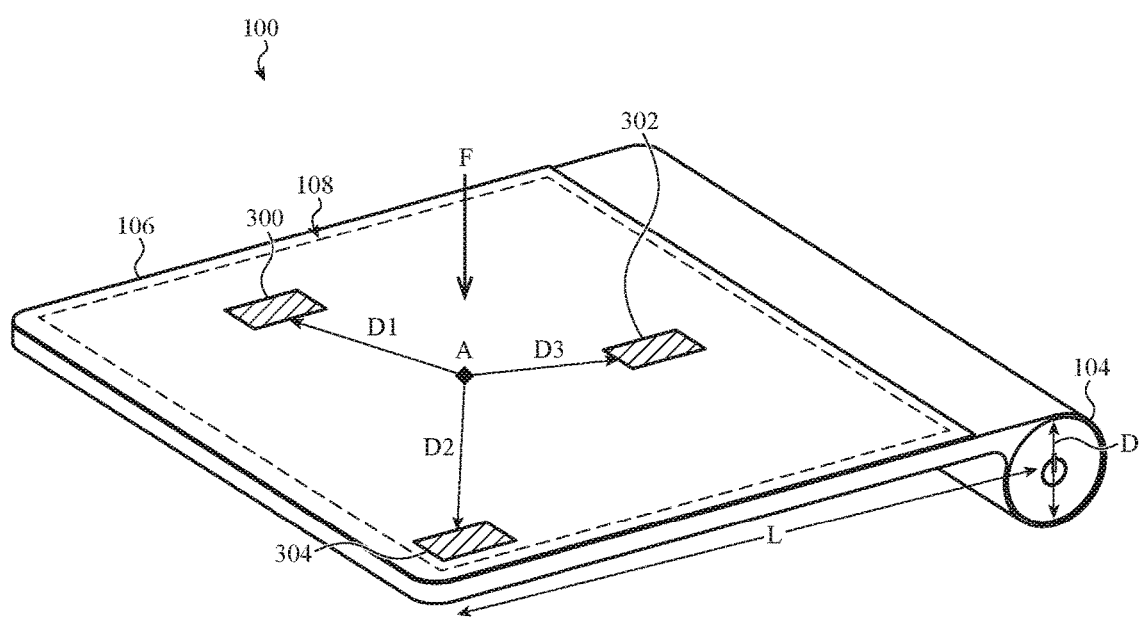
FIG. 3 shows relationship between force F applied at portable input device and reaction of support structures in accordance with the embodiments.

It should be noted that the resolution of force F by signal generating circuit 110 located at various locations of portable input device 100 can depend upon the location where force F is applied. As shown in FIG. 3, the force experienced at a signal generating circuit 300 can depend upon the distance d from the point A where force F is applied. In this way, the sensitivity of signal generating circuit 300 can vary based upon the location on portable input device 100 is placed. For example, signal generating circuit 302 centrally located can be expected to experience a larger portion of force F than would signal generating circuit 304 located more in the peripheral regions. Therefore, the intrinsic sensitivities of signal generating circuits 302 and 304 can be tuned so as to provide substantially uniform force detection across the touch pad surface area.

Figure 4:
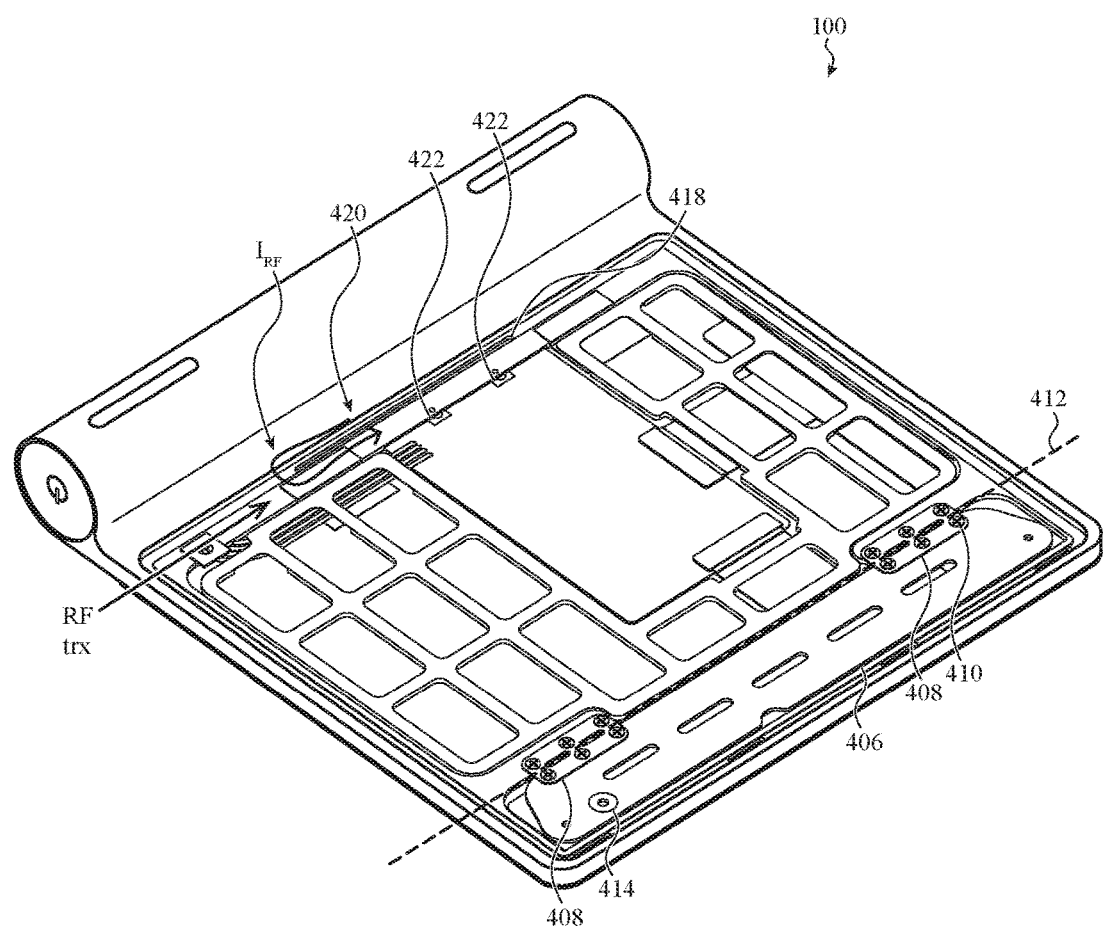
FIG. 4 shows an exposed rear view of portable input device in accordance with the described embodiments.

FIG. 4 shows an exposed rear view of portable input device 100 in accordance with the described embodiments. Input device 100 can include frame 402 (shown in isolated view in FIG. 5) formed of structurally suitable material such as aluminum or steel used to provide support for operational components 404 enclosed by housing 102. Operational components 404 can include wireless circuitry, touch sensitive circuitry, power management circuitry, processing circuitry, and so on. Foot bar 406 can be hingedly attached to frame 402 using flexible material, also referred to as flexure, as flex hinge 408. In the embodiments shown and described, flex hinge 408 can be secured to frame 402 using any number and type of attachment mechanisms, such as screws 410. Foot bar 406 can be formed of metal or other rigid material. Foot bar 406 can pivot about flex hinge 408 about hinge line 412 in response to force F. Set screw 414 can be used to adjust the mechanical response and position of foot bar 406 to force F by, for example, adjusting the position of foot bar 406 within cavity 416 formed in housing 102 (shown in more detail in FIG. 5). This adjustment can also modify the responsive of signal generating circuit 110. For example, when signal generating circuit 110 takes the form of a dome switch, set screw 414 can be used to adjust the position of foot bar 406 relative to the dome switch in order to adjust an amount of pre-loading of the dome switch. It should be noted that by pre-loading it is meant the amount of force applied to the dome switch in an OFF state that causes at least some deflection of the dome material of the dome switch. This deflection can substantially affect the feel of the dome switch by modifying the force required for the dome switch to engage the dome switch. The amount of deflection can be adjusted using set screw 414 to adjust the position of foot bar 406. In this way, the force required to engage dome switch 410 can be made substantially equal along foot bar 406. Set screw 414 can also be used to modify the alignment of foot bar 406 in relation to housing 102 within cavity 416. For example, a click force (i.e., an amount of force required to engage signal generating circuit 110 to generate a click event) can be measured and the height of foot bar 406 can be adjusted using set screw 414. In this way, foot bar 406 can be aligned to housing 102 within cavity 416 so as to be essentially flush with housing 102.

In order to provide adequate RF energy, a portion of frame 402 is used as an RF transmitter by forming slot portion 418 creating a current path from current feed 420 to current sink 422. Therefore when voltage $V_{RF}$ is applied at current feed 420, current $I_{RF}$ flows from current feed 420 along a current path illustrated by the arrow $I_{RF}$ to current sink 422 generating RF energy. That portion of metal frame 402 can in the vicinity of slot portion 418 can then act as an antenna and radiate a sufficient portion of the RF energy to establish a wireless communication channel with the external circuit.

Figure 5:
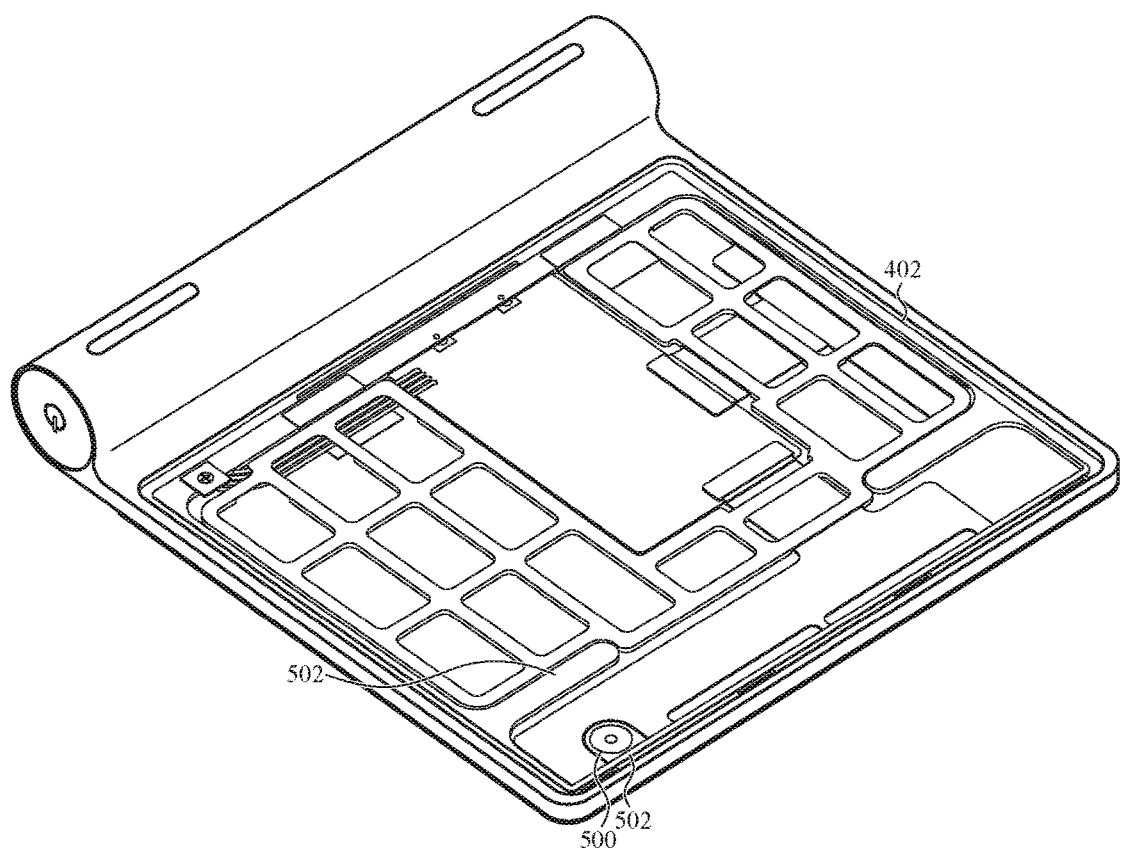
FIG. 5 shows a frame structure in accordance with the described embodiments.

Still referring to FIG. 5, dome switch 500 can be located within a well formed by portions 502 of frame 402. Portions 502 can limits the amount of material that resonates when dome switch 500 engages thereby modifying the sound quality dome. In this way, the sound quality of dome switch 500 can be tuned by placing dome switch 500 within the region formed by portions 502.

Figure 6:
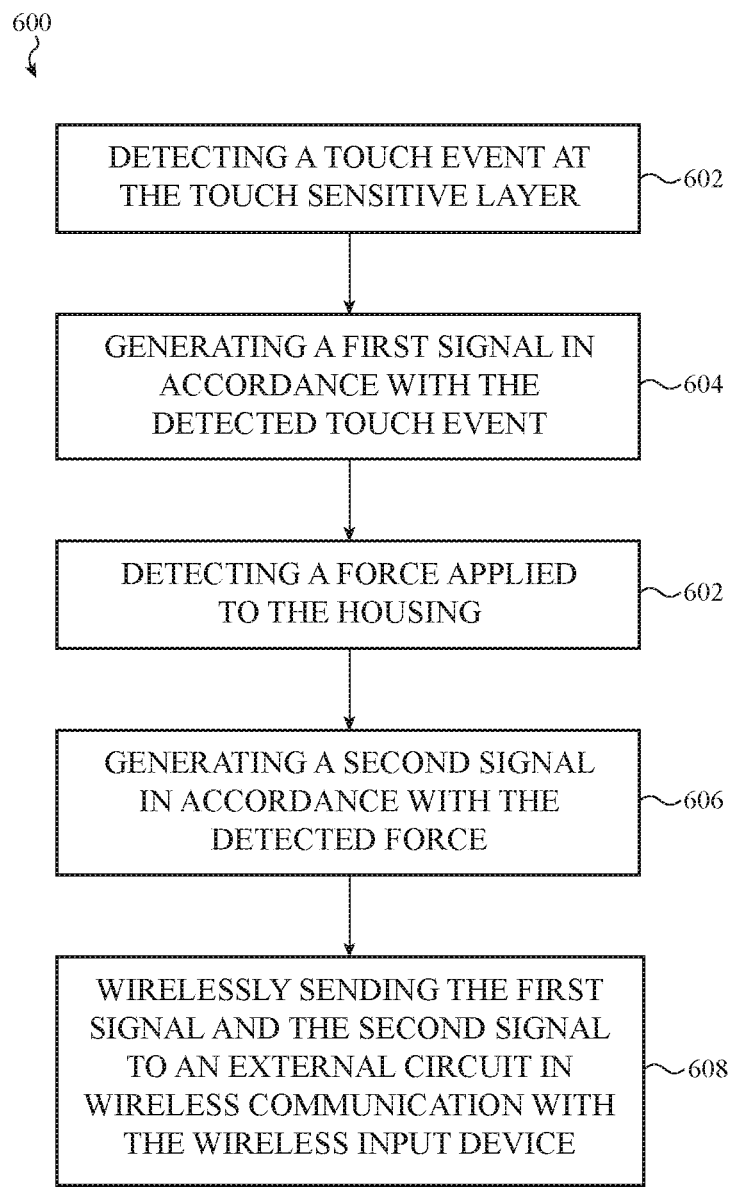
FIG. 6 shows a flowchart detailing a process in accordance with the described embodiments.

FIG. 6 shows a flowchart detailing process 600 in accordance with the embodiments shown and described. At 602, a touch event is detected at a touch sensitive layer. At 604, a first signal is generated in accordance with the detected touch event. At 606, a force is detected and at 608 a second signal is generated in accordance with the detected force. At 610, the first signal and the second signal are wirelessly sent to an external circuit in wireless communication with the wireless input device The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A trackpad, comprising:
a protective cover defining a touch-sensitive input surface;
a metal housing member having a shape configured to support the protective cover in an angled orientation relative to a support surface below the trackpad and having a slot formed therein to define at least part of an antenna structure;
a touch sensor positioned below the protective cover and configured to generate a first signal in response to a touch event on the protective cover; and
a force sensor configured to generate a second signal in response to a force applied to the protective cover;
wherein the antenna structure is configured to wirelessly transmit radio-frequency signals based on at least one of the first and second signals.

2. The trackpad of claim 1, wherein the force sensor is configured to output a signal representative of a magnitude of the force applied to the protective cover.

3. The trackpad of claim 1, further comprising a haptic actuator configured to produce a tactile output via the protective cover.

4. The trackpad of claim 3, wherein the tactile output mimics a sensation of a collapsing dome switch.

5. The trackpad of claim 1, wherein the metal housing member is formed from aluminum.

6. The trackpad of claim 1, further comprising circuitry configured to apply a current to the housing member to cause a portion of the housing member in a vicinity of the slot to transmit wireless signals.

7. The trackpad of claim 1, wherein the protective cover is glass.

8. An electronic device, comprising:
a housing member at least partially defining an interior volume of the electronic device and defining an integrally formed antenna structure;
a planar cover coupled to the housing member and defining substantially an entire user-facing surface of the electronic device;
a touch sensor configured to detect a touch event on the planar cover; and
a force sensor configured to detect a force of the touch event on the planar cover;
wherein the integrally formed antenna structure is configured to wirelessly transmit radio-frequency signals based on information from at least one of the touch sensor and the force sensor.

9. The electronic device of claim 8, wherein:
the integrally formed antenna structure comprises a slot formed in a wall of the housing member; and
the electronic device further comprises circuitry configured to apply a radio-frequency electrical current to the housing member proximate the slot.

10. The electronic device of claim 9, wherein the radio-frequency electrical current follows a current path at least partially around the slot.

11. The electronic device of claim 8, wherein the planar cover is glass.

12. The electronic device of claim 11, wherein the planar cover is opaque.

13. The electronic device of claim 8, wherein the planer cover is plastic.

14. The electronic device of claim 8, wherein the housing member has a shape configured to support the planar cover in an angled orientation relative to a support surface below the electronic device.

15. An electronic device, comprising:
a housing member at least partially defining an interior volume of the electronic device;
a glass member coupled to the housing member and defining an exterior surface of the electronic device;
a touch sensor configured to detect a location of a contact between a user and the glass member;
a force sensor configured to output a signal corresponding to a magnitude of force of the contact between the user and the glass member; and
wireless communication circuitry configured to apply an electrical signal through a portion of the housing member to communicate to a remote device via radio-frequency signals.

16. The electronic device of claim 15, wherein:
the housing member comprises a slot formed therein; and
the portion of the housing member defines a conductive path around at least a portion of the slot.

17. The electronic device of claim 15, wherein the housing member supports the glass member at an angle relative to a support surface below the electronic device.

18. The electronic device of claim 15, wherein the wireless communication communicates signals indicative of the location of the contact between the user and the glass member and indicative of the magnitude of force of the contact between the user and the glass member.

19. The electronic device of claim 15, further comprising a display layer below the glass member and configured to display images through the glass member.

20. The electronic device of claim 15, further comprising a haptic actuator configured to produce tactile outputs via the glass member in response to the contact between the user and the glass member.

* * * * *